United States Patent
Huber et al.

(10) Patent No.: US 6,387,429 B1
(45) Date of Patent: May 14, 2002

(54) METHOD AND APPARATUS FOR PRODUCING A PRE-GELLED STARCH PRODUCT AND NORMALLY STICKY EXTRUDATES WITH MINIMAL OR NO SURFACTANT

(75) Inventors: Gordon R. Huber; Bradley S. Strahm; Brian S. Plattner, all of Sabetha; Douglas D. Renyer, Wetmore; Robert D. Sunderland, Sabetha, all of KS (US)

(73) Assignee: Wenger Manufacturing, Inc., Sabetha, KS (US)

( * ) Notice: Subject to any disclaimer, the term of this patent is extended or adjusted under 35 U.S.C. 154(b) by 0 days.

(21) Appl. No.: 09/655,943

(22) Filed: Sep. 6, 2000

Related U.S. Application Data (60) Division of application No. 09/344,468, filed on Jun. 25, 1999, now Pat. No. 6,247,394, and a continuation-in-part of application No. 09/249,648, filed on Feb. 12, 1999, now abandoned, which is a continuation-in-part of application No. 09/135,203, filed on Aug. 17, 1998, now abandoned.

(51) Int. Cl.[7] .............................. A23L 1/00; A23P 1/00
(52) U.S. Cl. ..................... 426/516; 426/448; 426/449
(58) Field of Search ................................ 426/516, 448, 426/449, 519; 99/353; 425/377, 378.1

(56) References Cited

U.S. PATENT DOCUMENTS

| | | |
|---|---|---|
| 3,718,480 A | 2/1973 | Tremblay et al. |
| 3,800,050 A | 3/1974 | Popel |
| 3,970,761 A | 7/1976 | Wenger et al. |
| 4,465,702 A | 8/1984 | Eastman et al. |
| 4,573,278 A | 3/1986 | Ruiz-Avila |
| 4,752,139 A | 6/1988 | Hauck |
| 4,875,847 A | 10/1989 | Wenger et al. |
| 4,984,514 A | 1/1991 | Van Lengerich |
| 5,149,555 A | 9/1992 | Flindall |
| 5,189,092 A | 2/1993 | Koslow |
| 5,480,673 A | * 1/1996 | Rokey .................. 426/516 |
| 5,694,833 A | 12/1997 | Wenger |

FOREIGN PATENT DOCUMENTS

WO    WO00/08945    2/2000

OTHER PUBLICATIONS

S.J. Mulvaney, "Manufacturing Processes for the Production of Breakfast Cereals & Cereal–based Snacks", Dept. of Food Sci., Cornell University, website: http://cadstudio.m-ae.cornell,edu/realization/cereal–module/, Aug. 1998.

Jane, et al., Characterization of Granular Cold Water–Soluble Starch, Starch/Stärke 38 (1986) Nr. 8. S. 258–263.

* cited by examiner

Primary Examiner—George C. Yeung
(74) Attorney, Agent, or Firm—Hovey Williams LLP (57) ABSTRACT

An improved low shear extrusion and dehydrating apparatus (10) and method is provided for the continuous extrusion of various starting materials (e.g., starch-bearing grains or starch fractions thereof, proteinaceous materials and/or nutraceuticals) to yield improved products, especially cold water swelling or soluble starch products. The invention is also useful for forming pre-gelled starch products and for processing starch-bearing materials using little or no surfactant. The apparatus (10) preferably includes an elongated extruder (18) together with a tubular die assembly (20) coupled to the outlet of the extruder barrel (32), wherein the volumetric ratio of the die assembly (20) to the free volume of the extruder (18) is at least about 2, and the ratio of die assembly retention time to the extruder retention time is at least about 5. In another embodiment, the apparatus (10) further includes a dehydration assembly (14) having an agitator (56) operatively coupled to a drying or dehydrating tower (66) for drying and comminuting the extrudate after it emerges from die assembly (20).

31 Claims, 4 Drawing Sheets

METHOD AND APPARATUS FOR PRODUCING A PRE-GELLED STARCH PRODUCT AND NORMALLY STICKY EXTRUDATES WITH MINIMAL OR NO SURFACTANT

RELATED APPLICATIONS

This application is a divisional of U.S. patent application Ser. No. 09/344,468 filed Jun. 25, 1999, now U.S. Pat. No. 6,247,394, which is a continuation-in-part of U.S. patent application Ser. Nos. 09/135,203 filed Aug. 17, 1998, now abandoned, and of 09/249,648 filed Feb. 12, 1999, now abandoned, with each of these three applications being incorporated by reference herein.

FIELD OF THE INVENTION

The present invention is broadly concerned with low shear extrusion and drying apparatus and methods of extrusion of various products such as starches and proteinaceous products. In one aspect of the invention, methods of forming granular cold water soluble starch products (which can also be referred to as cold water swelling products) while producing little or no liquid effluent are provided. In this way, large quantities of the starch products can be produced in shorter periods of time compared to prior art processes. The invention is also directed towards methods of forming pre-gelled starch products and of processing starch-bearing materials which normally yield sticky, unworkable products using little or no surfactant, amylose-complexing agents, or lipids. In practice, an extruder is coupled with an elongated, tubular die assembly and processing conditions are selected so as to substantially cook the starch-bearing materials. This involves product residence times within the downstream die assembly which are greatly in excess of extruder residence times. In one embodiment, as the cooked extrudate emerges from the die assembly, it is passed through a dehydration assembly which substantially removes the liquids from the extrudate to yield a dried, solid cold water soluble starch product.

DESCRIPTION OF THE PRIOR ART

Starch-bearing materials such as prime starches and farinaceous grains have long been extrusion processed. For example, food thickeners can be made by extrusion techniques, although they generally do not have thickening powers equal to drum dried starches. Likewise, grains can be extrusion processed to give a number of useful end products. Generally speaking, extrusion of starch-bearing products, if not carefully controlled, can lead to wholly unworkable, sticky extrudates which cannot be properly sized, shaped or handled. It is known that extrusion processing and the shear conditions inherent therein tend to degrade the starch which, in the presence of moisture, leads to stickiness or functionality problems. It has been determined that shear conditions are a major contributing factor to the problems with prior extrusion processing of starches. Excess shear can lead to starch granule damage, vitamin losses, protein complexing or degradation, and reduction in molecular weight of biopolymers.

In order to overcome this issue, it has heretofore been thought necessary to add appreciable quantities of surfactants such as monoglycerides or lipids or derivatives thereof to the extrusion mixture. Although surfactant use can control the stickiness problem, the added surfactants are relatively expensive and add significant cost to the final product.

In the past, instant, non-granular starches have traditionally been formed using conventional drum-drying techniques. Generally, these starches have been chemically modified in order to achieve the desired gelling properties. U.S. Pat. No. 4,465,702 to Eastman et al. discloses a cold water soluble granular starch derived from chemically unmodified, ungelatinized corn starch. This starch is prepared by forming a slurry of corn starch in a liquid processing medium comprising water and alcohol. The slurry is heated to a temperature of at least 300° F. at or above autogenic pressure, after which the starch material is separated from the processing medium. However, the Eastman et al. process is a batch process, thus preventing large quantities of cold water soluble starch from being rapidly produced. Furthermore, the Eastman et al. process produces rather large quantities of liquid effluent.

In like manner, extrusion processing of proteinaceous products and nutraceuticals have presented problems such as protein complexation or degradation of proteins and vitamins or other nutraceuticals. Here again, it is believed that high shear conditions found in many extruders are the chief reasons why extrusion processing can create problems of these types.

There is accordingly a need in the art for improved, low shear extrusion apparatus and corresponding methods which can be used to process a wide variety of products while minimizing shear-related problems. For example, there is a need for a process for continually producing cold water soluble or swellable starches with little or no liquid effluent and with a minimal amount of shear.

SUMMARY OF THE INVENTION

The present invention provides improved extrusion apparatus and methods which yield improved end products. The invention is suitable for use in the processing of protein-bearing substances (e.g., vegetable, dairy or meat protein products) as well as processing of starch-bearing materials. In the latter case, the methods hereof product workable, starch-bearing normally sticky extrudates with little or no surfactant, lipids or derivatives thereof. Indeed, in preferred forms of this embodiment, the starch-bearing materials are essentially free of any such added ingredients. The invention further provides improved methods for forming pre-gelled starch products. In another embodiment, the invention provides extrusion and drying apparatus and methods for forming cold water soluble/swelling/gelling starch products. As used herein, soluble, swelling, and/or gelling starch refers to a starch which will form, in the presence of sufficient water and without additional heating or cooking, a coherent starch mass which is sliceable and has the appearance of a fully cooked starch gel. In the case of pre-gelled starches, while they will form a coherent starch mass in the presence of water without heating or cooking, some will not be sliceable nor have the appearance of a fully cooked starch gel.

Broadly speaking, extrusion cooking apparatus in accordance with all embodiments of the invention are in the form of an elongated extruder having a tubular barrel with an outlet end and at least one (and preferably a pair of) elongated, axially rotatable, helically flighted screw(s) within the barrel for moving material therethrough. A tubular die assembly is operatively coupled to the barrel adjacent the outlet end thereof and includes an elongated, tubular body with an apertured die secured to the end of the tubular body remote from the extruder barrel.

Preferably, the extrusion apparatus is designed so that the residence or retention time of the product within the die assembly is greater than the residence time within the extruder. Thus, the product is subjected to reduced shear during processing so as to minimize shear-related problems, e.g., the tendency of starch-bearing materials to become sticky and unworkable. At the same time, the extrusion conditions should be sufficient to adequately cook the product, which in the case of starch-bearing materials generally means that the materials have essentially completely gelatinized starch fractions (preferably at least about 80% gelatinized, and more preferably at least about 100% gelatinized). The volumetric ratio of the die assembly to the extruder free volume should be at least about 2, preferably from about 3–20, and more preferably from about 3–6.

When forming cold water soluble starch products, a dehydrating assembly is preferably positioned adjacent the die for receiving and at least partially dehydrating an extrudate. Preferably, the dehydrating assembly comprises an agitator and an upright dehydrating tower operatively coupled to receive material from the agitator.

In accordance with the apparatus and methods of the invention, cold water soluble and pre-gelled starch products can be continuously produced. These products can be formed utilizing starches selected from the group consisting of grain, root and tuber starches, rice, wheat, oats, barley, corn, rye, and mixtures thereof; in addition, whole grain products can also be produced from the foregoing types of starch-bearing grains.

Cold water soluble starch products in accordance with the invention have a water solubility of at least about 10%, and preferably from about 60–70%. As used herein, the cold water solubility of a starch-containing sample is determined by mixing 1 gram of the sample with 100 ml of distilled water in a Waring Blender for 15 seconds at low speed and 2 minutes at high speed. The suspension is then centrifuged at 3100 rpm for 15 minutes and dried at 110° C. for 4 hours thus evaporating the supernatant liquid. The residue is then weighed and compared to the starting weight of the sample to determine the percent of the sample that was solubilized in the water.

DETAILED DESCRIPTION OF THE PREFERRED EMBODIMENT

Figures 1, 2:
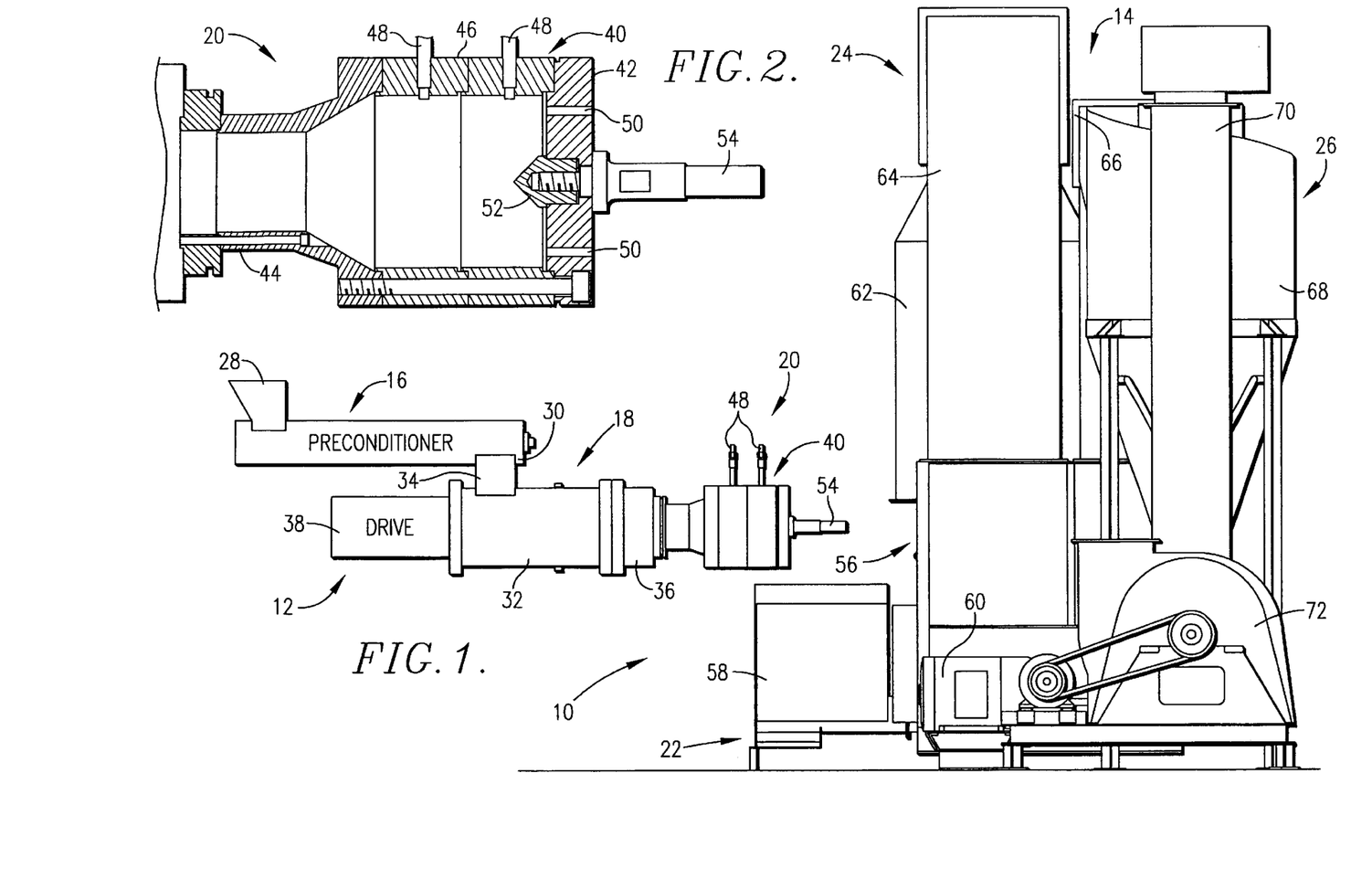
FIG. 1 is a schematic drawing illustrating the equipment setup of the extruder, die assembly, and dehydration assembly in accordance with one embodiment of the invention.
FIG. 2 is a side view in partial vertical section illustrating the preferred tubular die assembly.

Turning now to the drawings, FIG. 1 illustrates the equipment setup 10 for producing a starch product in accordance with the invention. The setup 10 broadly includes an extrusion assembly 12 and a dehydration assembly 14. Extrusion assembly 12 includes a preconditioner 16, an extruder 18, and an elongated, tubular die assembly 20 operatively coupled to extruder 18. Dehydration assembly 14 broadly includes a feed section 22, a drying section 24, and a vacuum section 26.

In more detail, the preconditioner 16 of assembly 12 is a Wenger 2 DDC (Wenger Manufacturing Inc., Sabetha, Kans.) of the type described in U.S. Pat. No. 4,752,139, which is incorporated by reference herein. The purpose of preconditioner 16 is to moisten and initially cook to a limited degree the starting dry ingredients. Preconditioner 16 includes an inlet 28 and an outlet portion 30.

In the embodiment illustrated, the extruder 18 is a 2-headed Wenger TX57 twin screw extruder having an elongated, sectionalized, barrel 32 presenting an inlet 34 and an outlet end 36. The barrel 32 is of essentially constant internal diameter and may be provided with internal flighting or ribs, as is well understood by those skilled in the art. In addition, barrel 32 is typically provided with external jackets (not shown) allowing introduction of heat exchange media (e.g., steam, water, or oil) for indirect temperature control of the extruder. In practice, the barrel 32 and the associated screws may be of conical configuration throughout all or a portion of their length, or they may be of constant, non-decreasing diameter. The L/D ratio of the extruder 18 is defined as the fill length of the extruder barrel divided by the maximum outside diameter presented by the screw element(s). In the case of the depicted twin screw extruder, the maximum outside diameter of one of the screw assemblies would be used. Preferably, the L/D ratio of extruders in accordance with the invention is from about 5–14, and more preferably from about 6–10. Also, barrel 32 may be equipped with one or more ports for the injection of additives, such as ethanol, directly into the confines of the barrel. A drive 38 conventionally composed of a drive motor and bearing house is operatively coupled to the internal screw element(s) within barrel 32 for rotating the screw element(s) at the desired rotational speed. Referring to FIG. 2, the die assembly 20 is made up of an elongated tubular body 40 as well as an apertured, endmost extrusion die 42. The body 40 includes an inlet portion 44 of substantially constant internal diameter, as well as an outlet portion 46 which has a radially enlarged internal diameter; the body 40 may assume other configurations such as conical or flared. Multiple process control monitoring devices such as transducers or thermocouples 48 may be provided in the outlet portion 46 for process control. The die 42 includes a plurality of spaced apart, flow-restricting through-apertures 50 for extrusion of product therethrough. In addition, the die 42 has a substantially centrally located, inwardly extending, outwardly tapered flow-directing member or "bullet" 52 affixed thereto. An elongated, outwardly extending knife shank 54 is also provided.

In alternate designs, the die spacer 20 could include internal, static mixing elements which would tend to further mix the product downstream of the extruder barrel. In addition, a flighted or other type of extension could be attached to the end of the extruder screw and extend into the confines of the die assembly 20 to provide such mixing.

Dehydration assembly 14 is preferably used when preparing cold water soluble starches and is a KIX Model K-1 dehydrator (available from Wenger Manufacturing Inc., Sabetha, Kans.) similar to the type described in U.S. Pat. No. 4,573,278, incorporated by reference herein. Feed section 22 of assembly 14 includes agitator 56, agitator feed bin 58, and agitator motor 60. Agitator 56 includes at least two sets of arms (each set comprises four arms) equally disposed in a perpendicular relationship about a vertical shaft centrally located within the housing of agitator 56 (not shown). Each arm includes a pair of blades disposed to form a V-shaped cross-section on the ends of each arm, with the free edges of the blades providing sharp cutting edges. This setup causes the material within agitator 56 to be constantly thrown around and comminuted by the cutting edges of the blades.

Section 24 of assembly 14 includes a burner chamber 62, a connecting duct 64, and a drying tower 66. Chamber 62 includes a burner (not shown) which may be fed with oil or other suitable fuel to provide a stream of hot air by means of a blower (not shown) to agitator 56.

The tower 66 has an upright vertical shaft and is conical in shape, with the diameter progressively decreasing as material travels up the tower. Tower 66 of the preferred dehydrator assembly 14 is a single pass tower without baffles, having a material inlet at the lower portion thereof operatively coupled to the material outlet of agitator 56. Tower 66 further includes a material outlet operatively connected to cyclone 68 via a connecting duct. The height of tower 66 is preferably from about 8–25 feet, and more preferably from about 18–22 feet. Those skilled in the art will appreciate that baffles can be incorporated into the shaft of tower 66 as described in U.S. Pat. No. 4,573,278. Furthermore, a vertical wall could be incorporated in the shaft of tower 66 in applications where two passes of the material through the shaft is necessary.

Vacuum section 26 includes cyclone 68, cyclone vacuum duct 70, and vacuum fan unit 72. Each of the components of section 26 is entirely conventional in nature. Cyclone 68 assists in continuing or creating pneumatic flow through assembly 14 by way of negative pressure.

In use, starting ingredients which include a starch are fed into inlet 28 of preconditioner 16 where the material is then moisturized and at least partially cooked. Preconditioning is normally carried out so that the product leaving the preconditioner has a total moisture content of from about 10–50% by weight, and more preferably from about 18–35% by weight, based upon the total weight of the preconditioned mixture taken as 100% by weight. The residence time in preconditioner 16 is preferably at least about 15 seconds, more preferably from about 15–600 seconds, and more preferably from about 120–240 seconds. The maximum temperature in preconditioner 16 should range from about 30–100° C., and more preferably from about 85–95° C. Although not specifically illustrated in the drawings, it is contemplated that use may be made of two serially interconnected preconditioners so as to achieve an even greater degree of preconditioning of the starting materials.

The material leaving preconditioner 16 is then fed directly into inlet 34 of the twin screw extruder 18 and the screws are rotated in order to advance the material along the length of barrel 32, thus subjecting the material to increasing temperature and shear. When preparing a cold water soluble starch, an alcohol (preferably a $C_1$–$C_4$ lower alcohol such as ethanol) is injected into barrel 32 during passage of the material through extruder 18. This alcohol injection should be at a rate of from about 5–100% by weight and preferably from about 10–25% by weight, based upon the weight of the starch content of the material passing through the extruder barrel.

Typical residence times of the material in the extruder barrel 32 range from about 3–20 seconds, and preferably from about 3–12 seconds. Maximum pressure levels achieved in the extruder barrel should be from about 50–2000 psi, and more preferably from about 100–600 psi. The maximum temperature that the material should achieve in barrel 32 is up to about 150° C., and preferably from about 60–110° C. Extruder 18 should be operated at rotation speeds of at least about 300 rpm, and more preferably from about 400–1500 rpm.

Upon emergence from extruder 18, the material enters inlet portion 44 of die assembly 20. The emerging extrudate passes through body 40 and apertures 50 and can then be dried in the desired manner. The temperature and pressure conditions within die assembly 20 should be: temperature, up to about 150° C., and more preferably from about 85–105° C.; and pressure, from about 50–2000 psi, and more preferably from about 100–600 psi. Upon emerging from assembly 20, the extrudate should have a moisture content of from about 10–70% by weight, and preferably from about 20–50% by weight, based upon the total weight of the extrudate taken as 100% by weight.

An important factor in practicing the methods of the invention is that the extruder 18 and die assembly 20 be sized to achieve an appropriate die assembly internal volume/extruder free volume ratio. The free volume of the extruder is calculated as the total internal volume of barrel 32 minus the volume occupied by the screw element(s) therein. The internal volume of the die assembly less any components therein is also determined. Broadly, the die assembly internal volume/extruder free volume ratio should be at least about 2, preferably from about 3–20, and more preferably from about 3–6.

In addition, the overall apparatus should be configured and operated in order to establish a retention time ratio of die assembly retention time to extruder retention time of at least about 5, and preferably from about 7–15, keeping in mind the extruder retention times set forth above. This involves appropriately sizing the extruder and die assembly, and also operating the extruder to achieve such preferred retention time ratios. Generally, the retention time of the product within the extruder is from about 3–20 seconds, whereas the retention time within the die assembly is at least about 15 seconds, and more preferably from about 50–600 seconds.

In some starch processing methods, it is advantageous to dry the extrudate in dehydration assembly 14 after it emerges from the die 42. This is particularly desirable when forming a cold water soluble starch product. In these instances, the extrudate is deposited into feed bin 58 of dehydration assembly 14. The transfer of extrudate from bin 58 to agitator 56 is carried out via a motor-driven screw conveyor (not shown) through a gate. The gate is controlled by means of a solenoid which detects the load on the agitator 56. The gate is then opened to add more material to agitator 56, thus controlling and maintaining a constant supply of the extrudate within agitator 56. Within the housing of agitator 56, the blade-equipped arms are continually rotated, thus continually throwing and comminuting the extrudate. At the same time, hot air is supplied to agitator 56 from burning chamber 62 by way of duct 64. This impact hot air entering the agitator 56 should have a temperature of from about 300–550° C., and preferably from about 350–450° C. As the extrudate is comminuted and dried within agitator 56, its density falls until it reaches such a level that the pressure within tower 66 allows the material to rise with the flow of hot air from agitator 56 into tower 66. Air flow and entrained dehydrated material passes upwardly through the shaft and outlet of tower 66 under negative air pressure to cyclone 68 by way of a connecting duct (not shown). The entraining or process air should have a temperature of from about 90–180° C., and more preferably from about 130–160° C. The residence time of the material within tower 66 is preferably about 1–2 seconds.

Once in cyclone 68, the dried solids are removed from the cyclone at an airlock (not shown), while saturated air passes from cyclone 68 through duct 70 to the fan unit 72 where it is then discharged into the atmosphere. The dried solids should have a moisture content of from about 0.5–18% by weight, and preferably from about 6–12% by weight, based upon the total weight of the dried solids taken as 100% by weight.

It is preferred that the time required for the extrudate material to enter agitator 56, pass through the remainder of dehydration assembly 14, and exit the airlock be no more than about 15 seconds, and preferably from about 5–8 seconds.

Where proteinaceous or nutraceutical-containing products are to be processed, generally the dehydration assembly 14 is omitted, but the extrusion assembly 12 of FIG. 1 is employed. In processing of such alternate products, the same preconditioning and extruder parameters of moisture contents, residence times, temperatures, pressures, die assembly internal volume/extruder free volume ratios, and retention time ratios of die assembly retention times to extruder retention times set forth above are applicable.

The following examples set forth preferred extrusion apparatus and methods in accordance with the invention. It is to be understood that the invention is not so limited and nothing in the examples should be taken as a limitation upon the overall scope of the invention.

EXAMPLE 1

In this example, a short length to diameter Wenger TX-57 extruder in combination with an elongated, tubular die extension was employed for the production of precooked rice analog products.

The extruder was of the type depicted in FIG. 1, and consisted of two heads. In particular, the extruder configuration was made up of the following components (where all parts are identified with Wenger Mfg. Co. part numbers): extruder barrel—55618-001 (inlet head) and 55619-001 (head No. 2). The screw assembly included the following rotating elements: Screw No. 1-55657-003,55657-003, 55625-003, 55626-103 and 55621-005; Screw No, 2- 55657-203, 55657-203B, 55625-003, 55626-103 and 55621-005. The tubular die for Run #1 was made up of: 55661-023, 56369-001, 55376-001, and 74010-513. For Run #2, the tubular die consisted of 55661-023, 56369-001, 55376-001, 55376-001, and 74010-513. A rotating knife assembly was positioned adjacent the outlet of the die for cutting the extrudate into a convenient size. The knife assembly included the following: 55226-003 (knife holder) and two knife blades (19272-027).

The preconditioner used in both of these setups was a Wenger Model 2 DDC preconditioner having Configuration No. 380 with the left shaft equipped with (from inlet to discharge) eighteen 75° forward position beaters, twenty-four 90° neutral position beaters and eighteen −75° reverse position beaters; the right shaft had four 75° forward position beaters and fifty-six −75° reverse position beaters.

In Run #1, the starting recipe was 100% by weight RL-100 rice flour. In Run #2, the recipe consisted of 96.75% by weight RL-100 rice flour, 2.50% by weight vegetable oil and 0.75% by weight Myvaplex surfactant. In each case, the starting material was fed into and through the preconditioner for moisturizing and partial cooking thereof, followed by passage through the two head extruder and associated tubular die structure. Subsequent to extrusion, the product was conventionally dried to a moisture content of about 9% by weight.

The following table sets forth the operating conditions for the preconditioner and extruder devices in the two runs.

TABLE 1

|  |  | Run #1 | Run #2 |
| --- | --- | --- | --- |
| RAW MATERIAL INFORMATION |  |  |  |
| Dry Recipe Density | kg/m³ | 783 | — |
| Dry Recipe Rate | kg/hr | 126 | 147 |
| Feed Screw Speed | rpm | 22 | 21 |
| PRECONDTIONING INFORMATION |  |  |  |
| Preconditioner Speed | rpm | 300 | 300 |
| Steam Flow to Preconditioner | kg/hr | 18 | 17 |
| Water Flow to Preconditioner | kg/hr | 29 | 30 |
| Preconditioner Discharge Temperature | ° C. | 85 | 84 |
| Moisture Entering Extruder | % wb | 31.78 | 33.17 |
| EXTRUSION INFORMATION |  |  |  |
| Extruder Shaft Speed | rpm | 500 | 500 |
| Motor Load | % | 22 | 19 |
| Control/Temperature-1st Head | ° C. | 50/55 | 50/56 |
| Control/Temperature-2nd Head | ° C. | 100/105 | 100/103 |
| Head/Pressure | kPa | 2/2770 | 2/2550 |
| Knife Drive Speed | rpm | 918 | 932 |
| FINAL PRODUCT INFORMATION |  |  |  |
| Extruder Discharge Moisture | % wb | 25.04 | 28.12 |
| Extruder Performance |  | Stable | Stable |

The post-extrusion drying was carried out in a multiple-stage dryer under the following conditions: zone 1 temperature, 65° C., zone 2 temperature, 70° C., zone 3 temperature, 69° C., retention time pass 1, 8.7 minutes, and retention pass 2, 11.5 minutes.

Figure 3:
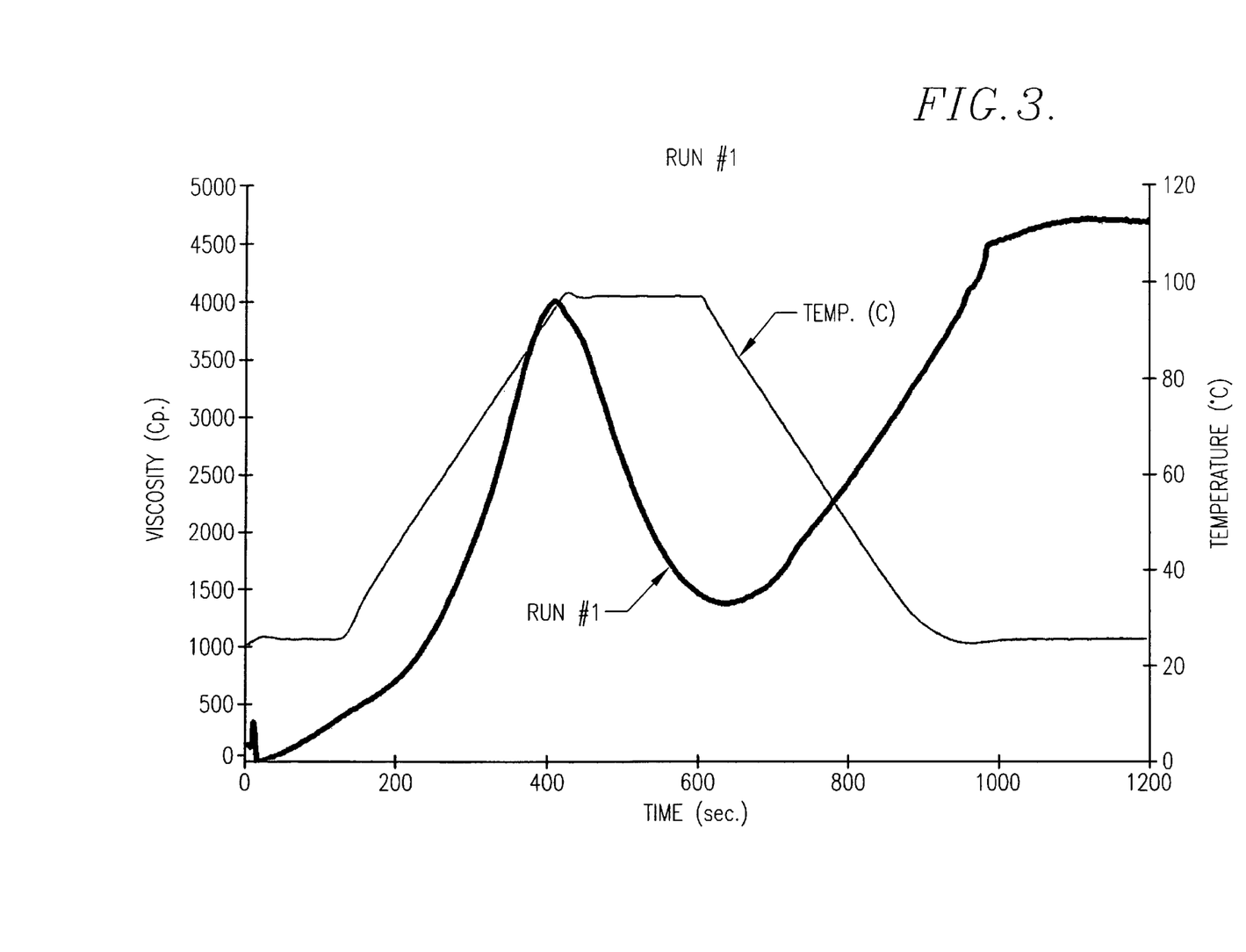
FIG. 3 is an Rapid Viscoamylograph (RVA) graph of a precooked rice analog product in accordance with the invention.

The straight rice flour run (No. 1) yielded a well-cooked product with little or no sticking off the die. The product rehydrated well (although the product was somewhat sticky) and had a good flavor. In Run #2, an additional spacer was added and this gave an improved cook. FIG. 3 is a graph illustrating an RVA analysis of the product from Run #1. This analysis was carried out using a Series 4 Rapid Visco Analyzer sold by Newport Scientific Pty. Ltd., Warriewood, NSW, Australia. In such tests, four grams of the product (dry matter basis) are mixed in 25 ml water and passed through the Rapid Visco Analyzer using the manufacturer's protocol.

EXAMPLE 2

In this example, a pre-cooked farinaceous cereal was produced using an extruder/tubular die arrangement of the type illustrated in FIGS. 1–2 (Run #3) with an extruder L/D ratio of 7.5, and this product was compared with a conventional product (Run #4) made using a nine head extruder setup (L/D ratio of 25.5:1) of the type illustrated in U.S. Pat. No. 4,769,251, incorporated by reference herein, as well as the cooking procedure described in that patent.

The Run #3 extruder consisted of two heads. In particular, the extruder configuration was made up of the following components (where all parts are identified with Wenger Mfg. Co. part numbers): extruder barrel—55618-001 (inlet head) and 55619-001 (head No. 2). The screw assembly included the following rotating elements: Screw No. 1- 55657-003, 55657-003, 55657-103, 55625-003, and 55621-005; Screw No, 2- 55657-003, 55657-003, 55625-003, 55625-003 and 55621-005. The tubular die was made up of: 55661-021, 55369-001, 55376-001, 55376-001, and 74010-745. A rotating knife assembly was positioned adjacent the outlet of the die for cutting the extrudate into a convenient size. The knife assembly included the following: 55226-001 (knife holder) and two knife blades (19273-001).

The preconditioner used in Run #3 was a Wenger Model 2 DDC preconditioner having Configuration No. 109.

In Run #3, the starting recipe consisted of 100% by weight of maize meal. In Run #4, the recipe consisted of 99.25% by weight maize meal and 0.75% by weight Dimodan PV surfactant. In each case, the starting material was fed into and through the preconditioner for moisturizing and partial cooking thereof, followed by passage through the associated extruder; in the case of Run #3, the material was then passed through the tubular die structure. In Run #4, a small die arrangement was employed, having a small ratio of die spacer volume to extruder free volume. Subsequent to extrusion, the product was conventionally dried to a moisture content of about 16% by weight.

The following table sets forth the operating conditions for the preconditioner and extruder devices in Run #3.

TABLE 2

|  |  | Run #3 |
| --- | --- | --- |
| RAW MATERIAL INFORMATION |  |  |
| Dry Recipe Density | kg/m³ | 626 |
| Dry Recipe Rate | kg/hr | 126 |
| Feed Screw Speed | rpm | 35 |
| PRECONDTIONING INFORMATION |  |  |
| Preconditioner Speed | rpm | 300 |
| Steam Flow to Preconditioner | kg/hr | 17 |
| Water Flow to Preconditioner | kg/hr | 29 |
| Preconditioner Discharge Temperature | ° C. | 79 |
| Moisture Entering Extruder | % wb | 34.59 |
| EXTRUSION INFORMATION |  |  |
| Extruder Shaft Speed | rpm | 500 |
| Motor Load | % | 14 |
| Control/Temperature-1st Head | ° C. | 35/59 |
| Control/Temperature-2nd Head | ° C. | 77/81 |
| Head/Pressure | kPa | 2/299 |
| Knife Drive Speed | rpm | 2148 |
| FINAL PRODUCT INFORMATION |  |  |
| Extruder Discharge Moisture | % wb | 31.38 |
| Extruder Performance |  | Stable |

The post-extrusion drying was carried out in a multiple-stage dryer under the following conditions: zone 1 temperature, 65° C., zone 2 temperature, 65° C., zone 3 temperature, 67° C., retention time pass 1, 8.6 minutes, and retention pass 2, 11.4 minutes.

Figure 4:
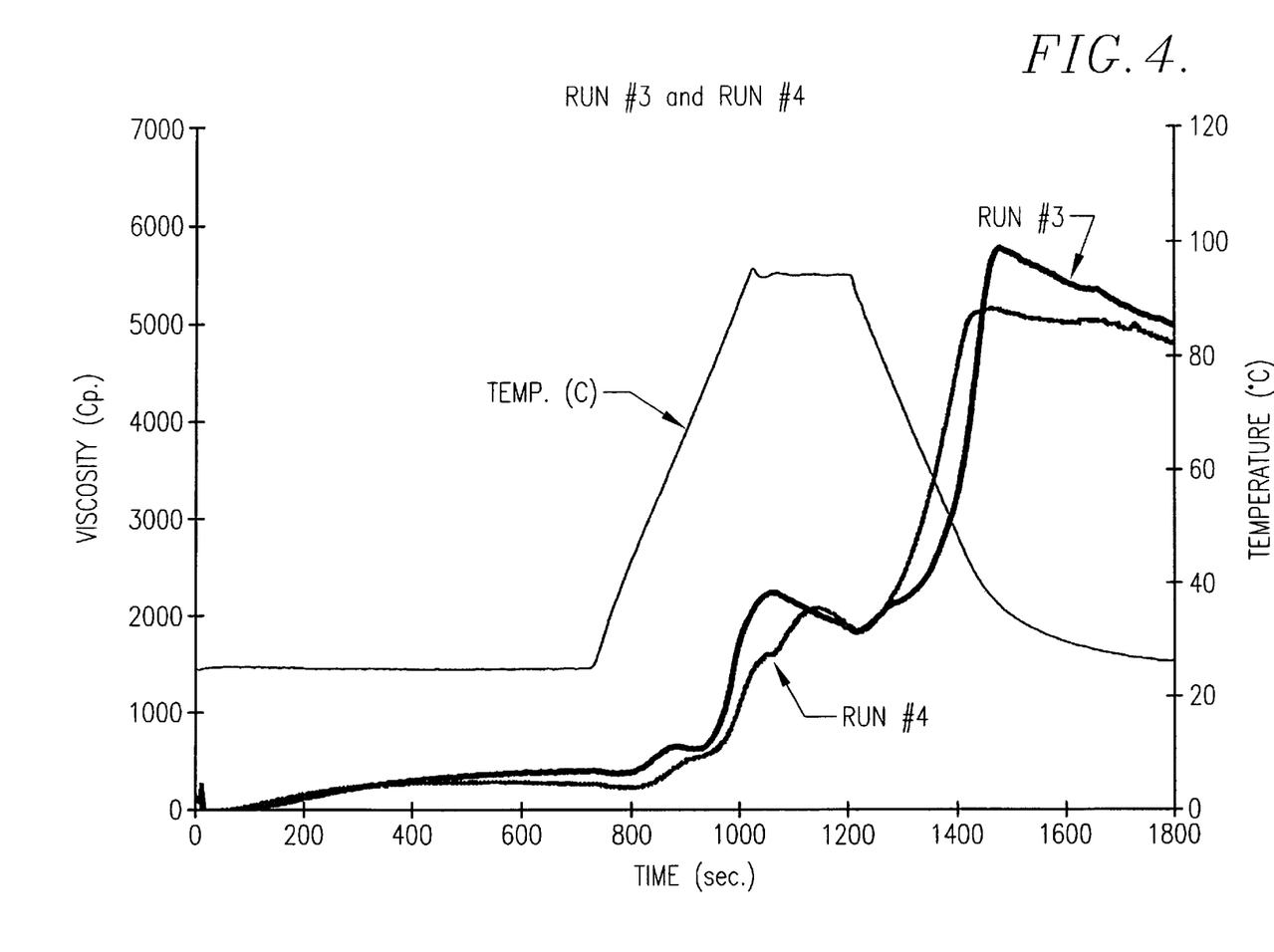
FIG. 4 is an RVA graph of a precooked no-surfactant farinaceous cereal product produced in accordance with the invention (Run #3), as compared with a conventional surfactant-added cereal product produced by a prior art method (Run #4)

The precooked cereal product made using the extruder device of the invention without surfactant was at least equivalent to the surfactant-added product of Run #4. As shown in FIG. 4, the RVA analysis of Runs #3 and 4 were virtually identical.

EXAMPLE 3

In this example, a short length to diameter Wenger TX-57 extruder in combination with an elongated, tubular die extension was employed for the production of cooked starch products.

The extruder consisted of two heads. In particular, the extruder configuration was made up of the following components (where all parts are identified with Wenger Mfg. Co. partnumbers): extruder barrel—55618-001 (inlet head) and 55619-001 (head No. 2). The screw assembly included the following rotating elements: Screw No. 1-55657-003, 55657-003, 55626-103, 55626-103 and 55624-201F and 55621-004; Screw No, 2- 55657-003, 55657-003B, 55626-103, 55626-103, 55624-201F, and 55621-005. The tubular die was made up of: 55376-001, 55376-002, 55662-001 and 74010-745 (with 12 of the 24 holes plugged). A rotating knife assembly was positioned adjacent the outlet of the die for cutting the extrudate into a convenient size. The preconditioner used in both of these setups was a Wenger Model 2 DDC preconditioner having Configuration No. 109 with the left shaft equipped with (from inlet to discharge) eighteen 75° forward position beaters, twenty-four 90° neutral position beaters and eighteen −75° reverse position beaters; the right shaft had eighteen 75° forward position beaters, twenty-four 90° neutral position beaters and eighteen −75° reverse position beaters.

In Runs #5–7, the starting recipe was, respectively, 100% by weight wheat starch, corn starch, and potato starch. In each case, the starting material was fed into and through the preconditioner for moisturizing and partial cooking thereof, followed by passage through the two head extruder and associated tubular die structure. Also, 95% ethanol was injected into the extruder barrel during each of the runs. Ethanol (or other appropriate $C_1$–$C_4$ lower alcohol) assists in obtaining higher viscosity starch products, as it prevents starch damage during extrusion processing. Subsequent to extrusion, the product was conventionally dried to a moisture content of about 9% by weight.

The following table sets forth the operating conditions for the preconditioner and extruder devices in the two runs.

TABLE 3

|  |  | Run #5 | Run #6 | Run #7 |
| --- | --- | --- | --- | --- |
| RAW MATERIAL INFORMATION |  |  |  |  |
| Dry Recipe Density | kg/m³ | 577 | 670 | 695 |
| Dry Recipe Rate | kg/hr | 90 | 95 | 95 |
| Feed Screw Speed | rpm | 18 | 21 | 18 |
| PRECONDTIONING INFORMATION |  |  |  |  |
| Preconditioner Speed | rpm | 300 | 300 | 300 |
| Steam Flow to Preconditioner | kg/hr | 12 | 12 | 8 |
| Water Flow to Preconditioner | kg/hr | 16 | 16 | 16 |
| Preconditioner Discharge Temperature | ° C. | 74 | 77 | 76 |
| Moisture Entering Extruder | % wb | 34.46 | — | 34.60 |
| EXTRUSIOIN INFORMATION |  |  |  |  |
| Extruder Shaft Speed | rpm | 444 | 444 | 494 |
| Motor Load | % | 15 | 12 | 7 |
| Water Flow to Extruder | kg/hr | 4 | 4 | 4 |
| Extruder Additive (Ethanol) Rate | kg/hr | 18 | 18 | 18 |
| Control/Temperature-1st Head | ° C. | 24/45 | 24/49 | 24/39 |
| Control/Temperature-2nd Head | ° C. | 51/50 | 51/50 | 51/53 |
| Head/Pressure | kpa | 2/1310 | 2/1010 | 2/340 |
| FINAL PRODUCT INFORMATION |  |  |  |  |
| Extruder Discharge Moisture | % wb | 34.87 | — | 42.64 |
| Extruder Performance |  | Stable | Stable | Stable |

Figure 5:
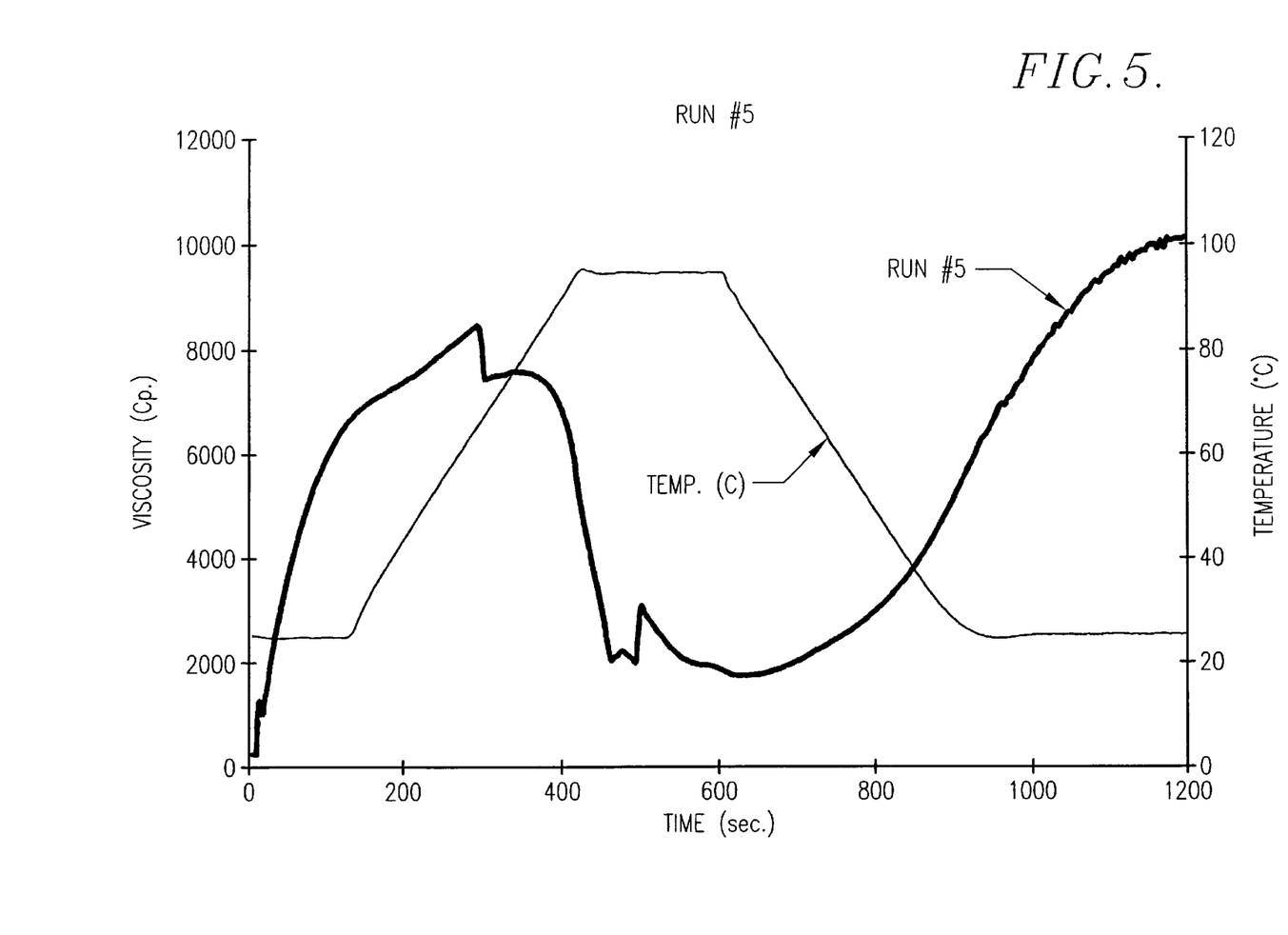
FIG. 5 is an RVA graph of wheat starch produced by the methods of the invention.

The post-extrusion drying was carried out in a multiple-stage dryer using conventional conditions. FIG. 5 illustrates the RVA analysis obtained with the product from Run #5.

EXAMPLE 4

In these runs, either a starch or a flour was fed to a Wenger TX57 twin screw extruder equipped with a preconditioner and an auger feed hopper and processed to obtain a cooked pre-gelled starch product. The preconditioner used was a Model 2DDC, configuration No. 109, having a total of 60 shaft-mounted beaters. The TX57 configuration included the following Wenger parts: head 1, 55618-001 and head 2, 55619-001. The device also included rotating elements from inlet to outlet, 55657-003, 55657-003 B, 55626-103, 55626-103, 55624-201 F, and 55621-005 on the left shaft, and rotating elements from inlet to outlet 55657-203, 55657-203, 55626-103, 55626-103, 55624-201 F, and 55621-005 on the night shaft. The extruder had a tubular die/adapter assembly coupled to the outlet end of the barrel made up of Wenger Parts No. 55367-001 AC, 55376-002 NA, 55662-001 AD, and 74010-745 NA. The die corresponding to Wenger Part No. 74010-745 included twenty-four holes with twelve of the holes blocked.

In carrying out the runs described below, the starting ingredient (either starch or flour) was fed into the preconditioner along with steam and water to premoisten and partially precook the ingredients. After preconditioning, the material was fed into the extruder barrel where the material was subjected to increasing temperatures, pressure, and shear. In addition, water was fed into the interior of the extruder barrel during passage of the ingredients therethrough. The jacketed heads were provided with circulating heating media. The resulting extrudate was dried in ambient air.

The recipes used are set forth in Table 4A. Tables 4B and 4C set forth the results of these production runs.

TABLE 4A

| RECIPE NO. | INGREDIENT |
|---|---|
| 1 | 100% wheat starch |
| 2 | 100% corn starch |
| 3 | 100% tapioca starch |
| 4 | 100% potato starch |
| 5 | 100% wheat flour |

TABLE 4B

|  |  | Run #8 | Run #9 | Run #10 | Run #11 |
|---|---|---|---|---|---|
| DRY RECIPE INFORMATION |  |  |  |  |  |
| Dry Recipe Moisture | % wb | 9.23 | 9.23 | 9.23 | 9.23 |
| Dry Recipe Density | kg/m$^3$ | 577 | 577 | 577 | 577 |
| Dry Recipe Rate | kg/hr | 100 | 100 | 100 | 110 |
| Feed Screw Speed | rpm | 20 | 18 | 19 | 17 |
| PRECONDITIONING INFORMATION |  |  |  |  |  |
| Preconditioner Speed | rpm | 300 | 300 | 300 | 300 |
| Steam Flow to Preconditioner | kg/hr | 12 | 12 | 12 | 12 |
| Water Flow to Preconditioner | kg/hr | 16 | 8 | 8 | 8 |
| Preconditioner Additive 1 Rate | kg/hr | — | 9 | 18 | 18 |
| Preconditioner Discharge Temperature | ° C. | 85 | 77 | 70 | 69 |
| Moisture Entering Extruder | % wb | 25.91 | 29.3 | 29.15 | 29.26 |
| EXTRUSION INFORMATION |  |  |  |  |  |
| Extruder Shaft Speed | rpm | 444 | 444 | 444 | 444 |
| Extruder Motor Load | % | 13 | 12 | 11 | 15 |
| Water Flow to Extruder | kg/hr | 15 | 15 | 15 | — |
| Control/Temperature 1st Head | ° C. | 24/37 | 24/48 | 24/49 | 24/46 |
| Control/Temperature 2nd Head | ° C. | 51/52 | 51/51 | 51/51 | 51/54 |
| Head/Pressure | kPa | 2/990 | 2/1140 | 2/1280 | 2/2100 |
| FINAL PRODUCT INFORMATION |  |  |  |  |  |
| Extruder Discharge Moisture | % wb | 36.54 | 35.12 | 35.07 | 30.72 |
| Extruder Performance |  | Stable | Stable | Stable | Stable |
| Recipe Number |  | 1 | 1 | 1 | 1 |
| Run Rating |  | Good | Good | Good | Good |

TABLE 4C

|  |  | Run #12 | Run #13 | Run #14 | Run #15 |
|---|---|---|---|---|---|
| DRY RECIPE INFORMATION |  |  |  |  |  |
| Dry Recipe Moisture | % wb | 11.22 | 12.64 | — | 14.04 |
| Dry Recipe Density | kg/m$^3$ | 670 | 517 | 695 | 652 |
| Dry Recipe Rate | kg/hr | 100 | 100 | 104 | 103 |
| Feed Screw Speed | rpm | 19 | 24 | 18 | 15 |
| PRECONDITIONING INFORMATION |  |  |  |  |  |
| Preconditioner Speed | rpm | 300 | 300 | 300 | 300 |
| Steam Flow to Preconditioner | kg/hr | 12 | 8 | 8 | 8 |
| Water Flow to Preconditioner | kg/hr | 16 | 16 | 16 | 16 |
| Preconditioner Additive 1 Rate | kg/hr | — | — | — | — |
| Preconditioner Discharge Temperature | ° C. | 76 | 74 | 77 | 75 |
| Moisture Entering Extruder | % wb | — | 31.77 | — | 33.72 |

TABLE 4C-continued

|  |  | Run #12 | Run #13 | Run #14 | Run #15 |
|---|---|---|---|---|---|
| EXTRUSION INFORMATION |  |  |  |  |  |
| Extruder Shaft Speed | rpm | 463 | 449 | 497 | 496 |
| Extruder Motor Load | % | 10 | 12 | 9 | 8 |
| Water Flow to Extruder | kg/hr | 15 | 15 | 15 | 15 |
| Control/Temperature 1st Head | ° C. | 24/50 | 24/39 | 24/41 | 24/43 |
| Control/Temperature 2nd Head | ° C. | 51/53 | 51/52 | 51/51 | 51/50 |
| Head/Pressure | kpa | 2/330 | 2/900 | 2/360 | 2/160 |
| FINAL PRODUCT INFORMATON |  |  |  |  |  |
| Extruder Discharge Moisture | % wb | 38.38 | 38.94 | 44.55 | 39.88 |
| Extruder Performance |  | Stable | Stable | Stable | Stable |
| Recipe Number |  | 2 | 3 | 4 | 5 |
| Run Rating |  | Good | Good | Good | Good |

In Run #8, the extrudate strands were slightly sticky and some uncooked starch (white spots) was visible. In Run #9, the final extrudate also included uncooked starch. The extrudate of Run #10 had a smooth glassy appearance and was clear with white spots visible, indicating uncooked starch. The product of Run #11 was beginning to expand, and white spots and bubbles were visible.

Run #13 utilized tapioca starch and the resulting product was very sticky and white and had a bumpy surface. Run #14 utilized potato starch and the resulting product had a cloudy, white appearance and was very sticky. In Run #15, wheat flour was the starting ingredient and the resulting product had a cloudy, yellow-white appearance and was slightly sticky off the die.

EXAMPLE 5

In this run, 100% wheat starch was fed to a Wenger TX57 twin screw extruder equipped with a preconditioner and an auger feed hopper and processed to obtain a cooked product. The preconditioner used was a Model 2DDC, configuration No. 109, having a total of 60 shaft-mounted beaters. The TX57 machine was of the type used in the previous examples, and the configuration included the following Wenger parts: head 1, 55618-001 and head 2, 55619-001. The device also included rotating elements from inlet to outlet, 55657-003, 55657-003 B, 55626-103, 55626-103, 55624-201 F, and 55621-005 on the left shaft, and rotating elements from inlet to outlet 55657-203, 55657-203, 55626-103, 55626-103, 55624-201 F, and 55621-005 on the right shaft. The extruder had a tubular die/adapter assembly coupled to the outlet end of the barrel made up of Wenger Parts No. 55662-001 AD, 55376-001 AC, 55376-001 AC, and 74010-745 NA. The extruder was equipped with two knife blades, Wenger Part No. 19272-027 in conjunction with a knife holder, Wenger Part No. 55226-001. In carrying out the runs described below, 100% wheat starch was fed into the preconditioner along with steam and water to premoisten and partially precook the ingredients. After preconditioning, the material was fed into the extruder barrel where the material was subjected to increasing temperatures, pressure, and shear. In addition, water was fed into the interior of the extruder barrel during passage of the ingredients therethrough. The jacketed heads were provided with circulating heating media. The extrudate was dried in ambient air.

TABLE 5

|  |  | Run #16 |
|---|---|---|
| DRY RECIPE INFORMATION |  |  |
| Dry Recipe Moisture | % wb | 11.82 |
| Dry Recipe Density | kg/m³ | — |
| Dry Recipe Rate | kg/hr | 97 |
| Feed Screw Speed | rpm | 37 |
| PRECONDITIONING INFORMATION |  |  |
| Preconditioner Speed | rpm | 199 |
| Steam Flow to Preconditioner | kg/hr | 11 |
| Water Flow to Preconditioner | kg/hr | 19 |
| Preconditioner Discharge Temperature | ° C. | 88 |
| Moisture Entering Extruder | % wb | 32.65 |
| EXTRUSION INFORMATION |  |  |
| Extruder Shaft Speed | rpm | 498 |
| Extruder Motor Load | % | 16 |
| Water Flow to Extruder | kg/hr | 5 |
| Control/Temperature 1st Head | ° C. | 50/51 |
| Control/Temperature 2nd Head | ° C. | 80/75 |
| Head/Pressure | kPa | 21/380 |
| Knife Drive Speed | rpm | 315 |
| DRYER INFORMATION |  |  |
| Zone 1 Temperature | ° C. | 24 |
| Zone 2 Temperature | ° C. | 24 |
| Zone 3 Temperature | ° C. | 24 |
| Retention Time - Pass 1 | min. | 0.9 |
| Retention Time - Pass 2 | min. | 1.4 |
| Fan Speed 1 | rpm | 1406 |
| Fan Speed 2 | rpm | 1406 |
| Fan Speed 3 | rpm | 1406 |
| FINAL PRODUCT INFORMATION |  |  |
| Extruder Discharge Moisture | % wb | 29.77 |
| Extruder Discharge Density | kg/m³ | 615 |
| Extruder Performance |  | Stable |
| Run Rating |  | Good |

The product of this run had a translucent appearance and was completely cooked and cuttable, yielding a quality pre-gelled starch product.

EXAMPLE 6

In these runs, the same equipment was used as described in Example 4 with the following exceptions: the extruder was equipped with two knife blades, Wenger Part No. 19272-027 in conjunction with a knife holder, Wenger Part No. 55226-001; in Run#17, the tubular die assembly coupled to the outlet end of the barrel was made up of Wenger Part Nos. 55662-001 AD, 55376-001 AC, 55376-

001 AC, and 74010-745 NA; and in Run #18, the tubular die assembly coupled to the outlet end of the barrel was made up of Wenger Part Nos. 55662-001 AD, 55376-001 AC, 55376-002 NA, and 74010-745 NA. In both runs, the die corresponding to Part No. 74010-745 contained 24 holes, with 12 holes having short land length and being plugged.

In both runs, the procedures followed were the same as described previously in Examples 4–5, with 100% wheat starch being used in Run #17, and 100% corn starch being used in Run #18. Table 6 sets forth the results of these production runs.

TABLE 6

|  |  | Run #17 | Run #18 |
|---|---|---|---|
| DRY RECIPE INFORMATION |  |  |  |
| Dry Recipe Moisture | % wb | 12.16 | 8.08 |
| Dry Recipe Density | kg/m³ | 545 | 669 |
| Dry Recipe Rate | kg/hr | 100 | 96 |
| Feed Screw Speed | rpm | 44 | 36 |
| PRECONDITIONING INFORMATION |  |  |  |
| Preconditioner Speed | rpm | 200 | 300 |
| Steam Flow to Preconditioner | kg/hr | 11 | 11 |
| Water Flow to Preconditioner | kg/hr | 19 | 21 |
| Preconditioner Discharge Temperature | ° C. | 85 | 86 |
| Moisture Entering Extruder | % wb | 28.65 | 24.32 |
| EXTRUSION INFORMATION |  |  |  |
| Extruder Shaft Speed | rpm | 499 | 449 |
| Extruder Motor Load | % | 14 | 11 |
| Water Flow to Extruder | kg/hr | 5 | 10 |
| Control/Temperature 1st Head | ° C. | 50/51 | 50/60 |
| Control/Temperature 2nd Head | ° C. | 80/74 | 80/76 |
| Head/Pressure | kPa | 2/0 | 2/5920 |
| Knife Drive Speed | rpm | 770 | 1494 |
| DRYER INFORMATION |  |  |  |
| Zone 1 Temperature | ° C. | 25 | 24 |
| Zone 2 Temperature | ° C. | 25 | 24 |
| Zone 3 Temperature | ° C. | 25 | 24 |
| Retention Time - Pass 1 | min. | 2 | 0.9 |
| Retention Time - Pass 2 | min. | 2 | 1.3 |
| Fan Speed 1 | rpm | — | 1406 |
| Fan Speed 2 | rpm | — | 1406 |
| Fan Speed 3 | rpm | — | 1406 |
| FINAL PRODUCT INFORMATION |  |  |  |
| Extruder Discharge Moisture | % wb | 32 | 24.81 |
| Extruder Discharge Density | kg/m³ | 705 | 714 |
| Extruder Performance |  | Stable | Stable |
| Duration of Run | min. | 30 | 20 |
| Run Rating |  | Good | Good |

In Run #17, the extrudate was clear in color and very translucent.

EXAMPLE 7

In these runs, either a starch or flour was fed to a Wenger TX57 twin screw extruder equipped with an elongated, tubular die extension and a preconditioner (as shown in FIG. 1) and processed to obtain a cold water soluble starch product, The preconditioner used was a Model 2DDC, configuration No. 109, having a total of 60 shaft-mounted beaters with the left shaft equipped with (from inlet to discharge) eighteen 75° forward position beaters, twenty-four 90° neutral position beaters, and eighteen −75° reverse position beaters; the right shaft had eighteen 75° forward position beaters, twenty-four 90° neutral position beaters, and eighteen −75° reverse position beaters. The TX57 machine was of the type illustrated in U.S. Pat. No. 4,875,847, incorporated by reference herein. The TX57 equipment is commercialized by Wenger Manufacturing of Sabetha, Kans., and the configuration included the following Wenger-parts: head 1, 55618-001 and head 2, 55619-001. The device also included rotating elements from inlet to outlet, 55657-003, 55657-003 B, 55626-103, 55626-103, 55624-201 F, and 55621-005 on the left shaft, and rotating elements from inlet to outlet 55657-203, 55657-203, 55626-103, 55626-103, 55624-201 F, and 55621-005 on the right shaft. The tubular die assembly coupled to the outlet end of the barrel was made up of Wenger Parts No. 55367-001 AC, 55376-002 NA, 55662-001 AD, and 74010-745 NA. The die corresponding to Wenger Part No. 74010-745 included twenty-four holes with twelve of the holes blocked.

In carrying out the runs described below, the starting ingredient (either starch or flour) was fed into the preconditioner along with steam and water to premoisten and partially precook the ingredients. After preconditioning, the material was fed into the extruder barrel where the material was subjected to increasing temperatures, pressure, and shear. In addition, water and 190 proof ethanol was fed into the interior of the extruder barrel during passage of the ingredients therethrough. The jacketed heads were provided with circulating heating media. The resulting extrudate was dried in ambient air.

The recipes used are set forth in Table 7A. Table 7B sets forth the results of these production runs.

TABLE 7A

| RECIPE NO. | INGREDIENT |
|---|---|
| 1 | 100% wheat starch |
| 2 | 100% corn starch |
| 3 | 100% tapioca starch |
| 4 | 100% potato starch |
| 5 | 100% wheat flour |

TABLE 7B

|  |  | Run #19 | Run #20 | Run #21 | Run #22 | Run #23 |
|---|---|---|---|---|---|---|
| DRY RECIPE INFORMATION |  |  |  |  |  |  |
| Dry Recipe Moisture | % wb | 9.23 | 11.22 | 12.62 | — | 14.04 |
| Dry Recipe Density | kg/m³ | 577 | 670 | 517 | 695 | 652 |
| Dry Recipe Rate | kg/hr | 90 | 95 | 100 | 95 | 98 |
| Feed Screw Speed | rpm | 18 | 21 | 23 | 18 | 15 |

TABLE 7B-continued

|  |  | Run #19 | Run #20 | Run #21 | Run #22 | Run #23 |
|---|---|---|---|---|---|---|
| PRECONDITIONING INFORMATION |  |  |  |  |  |  |
| Preconditioner Speed | rpm | 300 | 300 | 300 | 300 | 300 |
| Stearn Flow to Preconditioner | kg/hr | 12 | 12 | 8 | 8 | 12 |
| Water Flow to Preconditioner | kg/hr | 16 | 16 | 16 | 16 | 16 |
| Preconditioner Additive 1 Rate | kg/hr | — | — | — | — | — |
| Preconditioner Discharge Temperature | ° C. | 74 | 77 | 77 | 76 | 76 |
| Moisture Entering Extruder | % wb | 34.46 | — | 29.59 | 34.6 | 30.88 |
| EXTRUSION INFORMATION |  |  |  |  |  |  |
| Extruder Shaft Speed | rpm | 444 | 444 | 444 | 494 | 444 |
| Extruder Motor Load | % | 15 | 12 | 9 | 7 | 6 |
| Water Flow to Extruder | kg/hr | 4 | 4 | 4 | 4 | 4 |
| Extruder Additive Rate | kg/hr | 18 | 18 | 18 | 18 | 18 |
| Control/Temperature 1st Head | ° C. | 24/45 | 24/49 | 24/40 | 24/39 | 24/47 |
| Control/Temperature 2nd Head | ° C. | 51/50 | 51/51 | 51/51 | 51/53 | 51/51 |
| Head/Pressure | kPa | 2/1310 | 2/1010 | 2/960 | 2/340 | 2/0 |
| FINAL PRODUCT INFORMATION |  |  |  |  |  |  |
| Extruder Discharge Moisture | % wb | 34.87 | — | 37.54 | 42.64 | 41.25 |
| Extruder Performance |  | Stable | Stable | Stable | Stable | Stable |
| Recipe Number |  | 1 | 2 | 3 | 4 | 5 |
| Run Rating |  | Good | Good | Good | Good | Good |

In Run #19, the extrudate had a rough, bubbly texture, was not very sticky, and was very uniform. No spots were visible in the product and the product. Run #20 (which utilized corn starch instead of wheat starch and included 18 kg/hr of ethanol added to the extruder barrel during extrusion) resulted in a smooth, translucent, yellow-white product having no visible spots. In Run #21, ethanol was also added to the extruder barrel during extrusion at a rate of 18 kg/hr resulting in a clear, bubbly product which did not contain white spots. The product from Run #22 had a uniform texture and a clear, smooth surface. The extrudate of Run #23 did not contain white spots, but was sticky off the die.

EXAMPLE 8

In these runs, 100% wheat starch (Midsol 50) or corn starch was fed to a Wenger TX57 twin screw extruder equipped with a preconditioner and an auger feed hopper and processed to obtain a cooked product. The preconditioner used was a Model 2DDC, configuration No. 109, having a total of 60 shaft-mounted beaters and having the beaters positioned in each shaft as described in Example 7. The TX57 machine was of the type used in Example 7 and the configuration included the following Wenger parts: head 1, 55618-001 and head 2, 55619-001. The device also included rotating elements from inlet to outlet, 55657-003, 55657-003 B, 55626-103, 55626-103, 55624-201 F, and 55621-005 on the left shaft, and rotating elements from inlet to outlet 55657-203, 55657-203, 55626-103, 55626-103, 55624-201 F, and 55621-005 on the right shaft.

In Runs #24 and 25, the tubular die assembly coupled to the outlet end of the barrel made up of Wenger Parts No. 55662-001 AD, 55376-001 AC, 55376-002 NA, and 74010-745 NA. The die corresponding to part No. 74010-745 contained 24 holes, with 12 holes having short land length and being plugged. Also in Runs #24 and 25, the extruder was equipped with two knife blades, Wenger Part No. 19272-027 in conjunction with a knife holder, Wenger Part No. 55226-001.

In Run #26, the tubular die assembly coupled to the outlet end of the barrel was made up of Wenger Part Nos. 55662-001 AD, 55376-001 AC, and 55376-002 NA.

In carrying out the runs described below, 100% wheat starch or 100% corn starch was fed into the preconditioner along with steam and water to premoisten and partially precook the ingredients. After preconditioning, the material was fed into the extruder barrel where the material was subjected to increasing temperatures, pressure, and shear. In each of the runs, 190 proof ethanol was used as the extruder additive and was pumped into head 1, position 1. In addition, water was fed into the interior of the extruder barrel during passage of the ingredients therethrough. The jacketed heads were provided with circulating heating media. The L/D ratio of the extruder was 7.5:1. The extrudate was immediately passed through a three zone dryer. The product was then dried in a Wenger-Kix Flash Dryer (Wenger Manufacturing, Sabetha, Kansas) at process air temperatures of 100° C., 120° C., or 140° C. The product samples were dried at the respective temperatures for a period of about 2–3 seconds. The remaining Wenger Kix Flash Dryer parameters are set forth in Table 8A. Table 8B sets forth the ingredients which correspond to the particular recipe numbers, and Table 8C sets forth the results of these production runs.

TABLE 8A

| PARAMETER | FLASH DRYER SETTING |
|---|---|
| Flameback Temperature | 30° C. |
| Impact Temperature | 380° C. |
| Infeed Setting | 2.0 on dial |
| Agitator Amps | 7–18 amps |
| Cyclone Vacuum | 1.9 |
| Slide Gate | 1.5 inches from open |

TABLE 8B

| RECIPE NO. | INGREDIENT |
|---|---|
| 1 | 100% wheat starch (Midsol 50) |
| 2 | 100% corn starch |

TABLE 8C

|  |  | Run #24 | Run #25 | Run #26 |
|---|---|---|---|---|
| DRY RECIPE INFORMATION | | | | |
| Dry Recipe Moisture | % wb | 21.71 | 12.14 | — |
| Dry Recipe Density | kg/m$^3$ | 529 | 625 | 625 |
| Feed Screw Speed | rpm | 21 | 21 | 21 |
| PRECONDITIONING INFORMATION | | | | |
| Preconditioner Speed | rpm | 300 | 300 | 300 |
| Steam Flow to Preconditioner | kg/hr | 12 | 12 | 12 |
| Water Flow to Preconditioner | kg/hr | 16 | 16 | 15 |
| Preconditioner Discharge Temperature | ° C. | 86 | 89 | 87 |
| Moisture Entering Extruder | % wb | 34.46 | 26.71 | 23.87 |
| EXTRUSION INFORMATION | | | | |
| Extruder Shaft Speed | rpm | 449 | 448 | 448 |
| Extruder Motor Load | % | 16 | 22 | 11 |
| Water Flow to Extruder | kg/hr | 5 | — | — |
| Extruder Additive Rate | kg/hr | 18 | 18 | 24 |
| Control/Temperature 1st Head | ° C. | /50 | /55 | /51 |
| Control/Temperature 2nd Head | ° C. | 51/54 | 51/51 | 51/51 |
| Head/Pressure | kpa | 2/1030 | 2/1030 | 2/690 |
| Knife Drive Speed | rpm | 1100 | 1367 | — |
| DRYER INFORMATION | | | | |
| Zone 1 Temperature | ° C. | 27 | — | — |
| Zone 2 Temperature | ° C. | 28 | — | — |
| Zone 3 Temperature | ° C. | 29 | — | — |
| Retention Time - Pass 1 | min. | 2 | — | — |
| Retention Time - Pass 2 | min. | 2.4 | — | — |
| Fan Speed 1 | rpm | 1406 | — | — |
| Fan Speed 2 | rpm | 1406 | — | — |
| Fan Speed 3 | rpm | 1406 | — | — |
| FINAL PRODUCT INFORMATION* | | | | |
| Extruder Discharge Moisture | % wb | 36.82 | 29.45 | 35.37 |
| Extruder Discharge Rate | kg/hr | 79 | 152 | — |
| Extruder Discharge Density | kg/m$^3$ | 719 | 775 | — |
| Extruder Performance |  | Stable | Stable | Stable |
| Recipe Number |  | 1 | 2 | 2 |
| Run Rating |  | Good | Good | Good |

The products of these runs had a translucent appearance. The samples dried at process air temperatures of 140° C. rehydrated the fastest and had the highest viscosity when compared to the samples dried at process air temperatures of 100° C. and 120° C.

EXAMPLE 9

A sample of cold water soluble starch prepared in Run #24 of Example 8 was analyzed with x-ray diffraction. The patterns were recorded with Kα radiation. The operating parameters were 35 kV at 20 mA with a scanning speed of 2° 2θ/min., so 10 mm on the chart equals 1°. The sample gave a strong V-pattern with reflections at 2θ=13.7° (d=6.5 Å) and 2θ=20.90° (d=4.3 Å). There was a weak reflection at 2θ=8.0° (d=11 Å). This data indicated that the process changed the native A-type wheat starch to the V-type starch. The A-polymorph is insoluble in water at 25° C., while the V-polymorph swells and is partially soluble.

EXAMPLE 10

In these runs, the same equipment was used as described in Example 7 with the following exceptions: the extruder was equipped with two knife blades, Wenger Part No. 19272-027 in conjunction with a knife holder, Wenger Part No. 55226-001; in Run #27, the tubular die assembly coupled to the outlet end of the barrel was made up of Wenger Part Nos. 55662-001 AD, 55376-001 AC, 55376-001 AC, and 74010-745 NA; and in Run #28, the tubular die assembly coupled to the outlet end of the barrel was made up of Wenger Part Nos. 55662-001 AD, 55376-001 AC, 55376-002 NA, and 74010-745 NA. In both of the runs, the die corresponding to Part No. 74010-745 contained 24 holes, with 12 holes having short land length and being plugged.

In both runs, the extrusion procedures followed were the same as described previously with respect to Examples 7–9, with 100% wheat starch being used in Run #27, and 100% corn starch being used in Run #28. After extrusion, the product was dried in a flash dryer as described in Example 8. Table 9 sets forth the results of these production runs.

TABLE 9

|  |  | Run #27 | Run #28 |
|---|---|---|---|
| DRY RECIPE INFORMATION | | | |
| Dry Recipe Moisture | % wb | 12.15 | 8.08 |
| Dry Recipe Density | kg/m$^3$ | 545 | 669 |
| Dry Recipe Rate | kg/hr | 99 | 94 |
| Feed Screw Speed | rpm | 39 | 30 |
| PRECONDITIONING INFORMATION | | | |
| Preconditioner Speed | rpm | 200 | 200 |
| Steam Flow to Preconditioner | kg/hr | 11 | 11 |
| Water Flow to Preconditioner | kg/hr | 19 | 18 |
| Preconditioner Discharge Temperature | ° C. | 88 | 89 |
| Moisture Entering Extruder | % wb | 29.9 | 23.67 |

TABLE 9-continued

|  |  | Run #27 | Run #28 |
|---|---|---|---|
| EXTRUSION INFORMATION |  |  |  |
| Extruder Shaft Speed | rpm | 499 | 499 |
| Extruder Motor Load | % | 17 | 19 |
| Water Flow to Extruder | kg/hr | — | — |
| Extruder Additive Rate | kg/hr | 18 | 17.7 |
| Control/Temperature 1st Head | ° C. | 50/50 | 50/53 |
| Control/Temperature 2nd Head | ° C. | 80/90 | 80/78 |
| Head/Pressure | kPa | 210 | 2/2380 |
| Knife Drive Speed | rpm | 539 | 1296 |
| DRYER INFORMATION |  |  |  |
| Zone 1 Temperature | ° C. | 25 | 24 |
| Zone 2 Temperature | ° C. | 25 | 24 |
| Zone 3 Temperature | ° C. | 25 | 24 |
| Retention Time - Pass 1 | min. | 2 | 0.9 |
| Retention Time - Pass 2 | min. | 2 | 1.3 |
| Fan Speed 1 | rpm | — | 1406 |
| Fan Speed 2 | rpm | — | 1406 |
| Fan Speed 3 | rpm | — | 1406 |
| FINAL PRODUCT INFORMATION |  |  |  |
| Extruder Discharge Moisture | % wb | 32 | 21.65 |
| Extruder Discharge Density | kg/m$^3$ | 705 | 695 |
| Extruder Performance |  | Stable | Stable |
| Duration of Run | min. | 30 | 15 |
| Run Rating |  | Good | Good |

In Run #27 the extrudate was translucent with no uncooked starch spots in it. In Run #28 the extrudate was clear in color and very translucent.

While the preferred embodiments of the present invention for forming cold water soluble starch products make use of a dehydrating assembly as illustrated and described, the invention is not so limited. For example, use can be made of a wide variety of drying units, particularly those such as fluidized bed dryers which involve conveying or suspending of the extrudate in a heated, flowing airstream.

We claim:

1. A method of processing a food product comprising the steps of:
    passing said product including a protein or starch-bearing food ingredient in serial order through an extruder and a die assembly to yield an extruded product,
    said extruder comprising an elongated, tubular barrel having an outlet end with at least one elongated, axially rotatable, helically flighted screw within the barrel, said die assembly including an elongated, tubular body operatively coupled to said barrel adjacent the outlet end thereof, and an apertured die coupled to said body adjacent the end thereof remote from said extruder said die presenting a die opening therethrough which is substantially smaller in maximum cross-sectional area than the minimum cross-sectional area presented by said tubular body; and
    during said passing step, rotating said screw at a rate of at least about 300 rpm, and causing said product to experience a retention time ratio of die assembly retention time to extruder retention time of at least about 5.

2. The method of claim 1, said retention time ratio being from about 7–15.

3. The method of claim 1, the retention time of said product in said extruder being from about 3–20 seconds.

4. The method of claim 1, the retention time of said product in said die assembly being at least about 15 seconds.

5. The method of claim 4, the retention time of said product in said die assembly being from about 50–600 seconds.

6. The method of claim 1, including the step of controlling the temperature of said product within said extruder to a maximum of up to about 150° C.

7. The method of claim 1, including the step of controlling the pressure within said extruder to a maximum of from about 50–2000 psi.

8. The method of claim 1, said product being a starch-bearing product selected from the group consisting of potato, tapioca, grain, root and tuber starches, rice, wheat, oats, barley, corn rye, and mixtures thereof.

9. The method of claim 1, including the step of subjecting said product to a preconditioning step prior to passage thereof through said extruder, said preconditioning step including the steps of adding moisture to the product and heating the product.

10. The method of claim 1 including the step of drying said product after passage thereof through said extruder and die assembly.

11. The method of claim 11, said product being essentially free of added surfactant.

12. The method of claim 9, the retention time of said product in said preconditioner being at least about 15 seconds.

13. The method of claim 1, further including the steps of:
    agitating said extruded product; and
    pneumatically passing said agitated product through a dehydrating tower.

14. The method of claim 13, wherein said agitating step comprises placing said extruded product into the chamber of a receiver having an agitator within the chamber,
    said agitator comprising a plurality of arms mounted radially on a rotating shaft, each of said arms including a pair of blades disposed so that the free edges of said blades form cutting edges directed in the direction of rotation of said shaft,
    said shaft being rotated during said agitating step so that said blades contact said extruded product.

15. The method of claim 13, wherein said agitating step comprises contacting air having an impact temperature of from about 300–55020 C. with said extruded product.

16. The method of claim 13, wherein said dehydrating tower has a material outlet and said passing step comprises applying negative air pressure to said outlet.

17. The method of claim 16, wherein said negative air pressure is applied by a cyclone separator having a material outlet to create an air flow through said separator for further drying the product and for separating said product from said air flow.

18. The method of claim 17, further including the step of passing said separated product through said cyclone material outlet, and wherein the amount of time that passes from the beginning of said agitating step to the time when the product passes through said cyclone material outlet is less than about 15 seconds.

19. The method of claim 13, wherein the residence time of said agitated product in the tower is from about 1–2 seconds.

20. The method of claim 13, wherein the product resulting from said pneumatic passing step has a moisture content of from about 0.5–18% by weight, based upon the total weight of the product taken as 100% by weight.

21. The method of claim 13, the retention time of said product in said extruder being from about 3–20 seconds.

22. The method of claim 13, the retention time of said product in said die assembly being at least about 15 seconds.

23. The method of claim 13, wherein the maximum temperature of the product within said extruder is up to about 150° C.

24. The method of claim 13, wherein said product comprises starch selected from the group consisting of grain, root and tuber starches and mixtures thereof, and starch-bearing grain products selected from the group consisting of rice, wheat, oats, barley, corn, rye, and mixtures thereof.

25. The method of claim 13, further including the step of subjecting said product to a preconditioning step prior to passage thereof through said extruder, said preconditioning step including the steps of adding moisture to the product and heating the product.

26. The method of claim 13, further including the step of introducing an alcohol into said extruder barrel during the passing of said product therethrough.

27. The method of claim 1, said product selected from the group consisting of protein-bearing products and nutraceuticals.

28. The method of claim 27, said protein bearing products selected from the group consisting of vegetable, dairy and meat protein products.

29. A method of preparing a food product comprising the steps of:

passing a product comprising rice in serial order through an extruder and a die assembly to yield an extruded product;

said extruder comprising an elongated, tubular barrel having an outlet end with at least one elongated, axially rotatable, helically flighted screw within the barrel, said die assembly including an elongated, tubular body operatively coupled to said barrel adjacent the outlet end thereof, and an apertured die coupled to said body adjacent the end thereof remote from said extruder said die presenting a die opening therethrough which is substantially smaller in maximum cross-sectional area than the minimum cross-sectional area presented by said tubular body; and during said passing step, rotating said screw at a rate of at least about 300 rpm, and causing said product to experience a retention time ratio of die assembly retention time to extruder retention time of at least about 5.

30. The method of claim 29, said rice being mixed with a surfactant.

31. A method of preparing a food product comprising the steps of:

passing a nutraceutical-containing product including a protein or starch-bearing ingredient in serial order through an extruder and a die assembly to yield an extruded product;

said extruder comprising an elongated, tubular barrel having an outlet end with at least one elongated, axially rotatable, helically flighted screw within the barrel, said die assembly including an elongated, tubular body operatively coupled to said barrel adjacent the outlet end thereof, and an apertured die coupled to said body adjacent the end thereof remote from said extruder said die presenting a die opening therethrough which is substantially smaller in maximum cross-sectional area than the minimum cross-sectional area presented by said tubular body; and during said passing step, rotating said screw at a rate of at least about 300 rpm, and causing said product to experience a retention time ratio of die assembly retention time to extruder retention time of at least about 5.

* * * * *